United States Patent
Spanke et al.

(10) Patent No.: US 7,966,141 B2
(45) Date of Patent: Jun. 21, 2011

(54) METHOD FOR EVALUATING AND CORRECTING TOTAL MEASUREMENT SIGNALS

(75) Inventors: Dietmar Spanke, Steinen (DE); Edgar Schmitt, Friesenheim (DE); Holger Steltner, Esslingen (DE); Alexey Malinovskiy, Lörrach (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 369 days.

(21) Appl. No.: 11/667,930

(22) PCT Filed: Nov. 9, 2005

(86) PCT No.: PCT/EP2005/055853
§ 371 (c)(1),
(2), (4) Date: Apr. 27, 2009

(87) PCT Pub. No.: WO2007/065469
PCT Pub. Date: Jun. 14, 2007

(65) Prior Publication Data
US 2009/0235736 A1    Sep. 24, 2009

(30) Foreign Application Priority Data
Nov. 17, 2004 (DE) .......................... 10 2004 055 551

(51) Int. Cl.
*G01F 23/296* (2006.01)

(52) U.S. Cl. .......................................................... 702/85
(58) Field of Classification Search ..................... 702/85
See application file for complete search history.

(56) References Cited

U.S. PATENT DOCUMENTS
5,734,346 A    3/1998    Richardson

FOREIGN PATENT DOCUMENTS

| | | |
|---|---|---|
| DE | 44 07 369 A1 | 9/1995 |
| DE | 43 27 333 C2 | 8/1996 |
| EP | 0 928 974 A2 | 7/1999 |
| GB | 2 350 004 A | 11/2000 |
| WO | WO 03/016835 A1 | 2/2003 |

*Primary Examiner* — Tung S Lau
(74) *Attorney, Agent, or Firm* — Bacon & Thomas, PLLC

(57) ABSTRACT

An improved and more accurate method for evaluating and correcting total measurement signals (TS(n)) of measuring devices. The invention concerns a method for evaluating and correcting total measurement signals (TS(n)) of a measuring device, wherein measuring signals are transmitted in the direction of a medium and reflected on a surface of the medium as wanted echo signals or on a surface of a disturbing element as interference signals and received. In the case of a modification of at least one technical, process condition in the container and/or a modification of at least one technical, measurement condition of the measuring device, an independent reference curve is ascertained on the basis of a current static reference curve, wherein the interference signals are masked out of the raw echo curve on the basis of a masking algorithm, which applies the independent reference curve.

14 Claims, 5 Drawing Sheets

METHOD FOR EVALUATING AND CORRECTING TOTAL MEASUREMENT SIGNALS

TECHNICAL FIELD

The present invention relates to a method for evaluating and correcting total measurement signals of a measuring device working according to a travel-time measurement method and employed for ascertaining fill level of a medium in a container.

BACKGROUND DISCUSSION

Measuring devices are used frequently in automation and process control technology for measuring process variables, such as flow (e.g. flow rate), fill level, pressure and temperature, or some other physical and/or chemical process variable of a process. The present assignee produces and sells, among others, measuring devices, under the marks Micropilot and Prosonic, which work according to travel-time measurement methods and which serve for ascertaining and/or monitoring a fill level of a medium in a container. In travel-time measuring methods, by way of example, ultrasonic waves are transmitted from a sound transducer, or microwaves, respectively radar waves, are transmitted via an antenna or are guided on a waveguide protruding into the medium. These transmitted waves are reflected on the surface of the medium and received back, following a distance-dependent travel time of the signal, and are then called "wanted", or "useful", echo-signals, or waves. From the travel-time, taking into consideration the known propagation velocity of the particular transmitted waves, the fill level of the medium in a container can be calculated.

Travel-time measuring methods are divided, fundamentally, into two ascertainment methods. Thus, a first travel-time measurement method is the time-difference measurement method, which ascertains the duration of the travel-time of a transmitted, high-frequency, pulse signal on a path over which it travels. Another widely used ascertainment method involves determining the frequency difference of a continuously transmitted, high-frequency signal, whose transmission frequency is, for example, continuously changed with time, relative to the reflected, received, high-frequency signal (FMCW—Frequency Modulated Continuous Wave). In the following, only the pulse travel-time method will be discussed; however, the method of the invention is equally applicable to the other travel-time methods, such as e.g. FMCW.

The transmitted measuring signals form, with the received, wanted echo signals, a total measurement signal, which can, under real measurement conditions, also contain interference echo signals. These interference echo signals arise from various causes, for example:
  Reflection on objects installed in or on the container;
  multi-path propagation (retro-reflections) and multi-mode propagation;
  dispersion of the propagated waves;
  foam- and accretion-formation of the medium;
  filling and emptying procedures;
  reflection characteristics of the medium;
  low dielectric constant of the medium;
  humidity in the container;
  turbulent surface of the medium.

In the current state of the art, there are various approaches toward the goal of removing these interference echo signals from the total measurement signal, since interference echo signals can make difficult the evaluation and ascertaining of fill level. For instance, they can cover the wanted echo signal.

In European Patent EP 1 069 438 A1, a method and apparatus are proposed, which, independently of interference signals, and, particularly, independently of multiple reflections or multi-mode propagation, enable a highly accurate fill level measurement. Via a special manner of proceeding, at certain fill level values, a correction value is ascertained from the difference of the amplitude distance value and the phase distance value, and is stored. Between two correction values of the certain fill level values, an interpolation of the values is performed. By these correction values, any fill level can be ascertained highly accurately, independently of multiple reflections and multimode propagation.

Another approach is described in German Patent DE 43 27 33 C2 and concerns a method for measuring fill level using a travel-time measuring device, wherein the interference signals are corrected by means of subtracting, from the total signal, an ascertained intensity value of the first encountered interference signal.

Additionally, in published international application WO 03/016835 A1, a method for evaluating measurement signals of a measuring device working according to a travel-time principle is described, wherein a currently recorded measurement curve is compared with reference signal data. In the comparison of the reference signal data to the currently recorded measurement curve, a correction factor can be determined from the time shifting of corresponding interference and wanted signals. The correction factor is then used to ascertain the sought fill level in cases where the wanted signal of the fill level is not present or can not be evaluated.

The methods and devices of the above-described applications, while dedicated to the removal of interference signals from the measurement signal, all have the problem, that they can not react to changes of process conditions in the container and influencing the measurement signal, or to changes of measurement method and measurement performance of the measuring device.

In published European patent application EP 0 961 106 A1, a fill level measuring device for continuous measurement of fill level of a fill substance in a container is described.

In this patent application (FIG. 4 with description), such interference echo signals are ascertained, for example, in a limit curve, and stored. This limit curve is ascertained on the basis of a measurement in empty container and represents, thus, the so-called "empty echo-function", to which an additional, constant offset of the amplitude values is added. In the method of ascertaining the fill level, only those values are used in the current echo function, which lie above this limit curve. In the description (FIGS. 2 and 3), also discussed is the problem of technical, process conditions, which arise during a measuring of travel time of waves in a container. The problem solution proposed in the patent application involves providing, in addition to the fill level measuring device, four limit value switches at different heights in the container, for enabling a correction, or calibration, of the limit curve to the technical, process changes in the container. This integration of limit value switches has the disadvantages that the additional limit value switches increase costs for the total measurement installation and introduce additional disturbing elements on the container wall, such as can influence the measurement signal by reflected, interference echo signals.

SUMMARY OF THE INVENTION

An object of the invention is to provide an improved and more accurate method for evaluating and correcting total measurement signals of measuring devices, which method reacts to changes in the measuring.

The object is achieved according to the invention by a method for evaluating and correcting total measurement signals of a measuring device working according to a travel time method and applied for ascertaining fill level of a medium in a container, which method includes features as follows: that, during a measurement cycle, measuring signals are transmitted toward the medium, reflected on a surface of the medium as wanted echo signals, or on a surface of a disturbing element as interference echo signals, and received; that a low frequency signal, termed "intermediate frequency signal", is produced from a high frequency, total measurement signal composed of superposed transmitted measuring signals, reflected, wanted echo signals and interference echo signals, by a sequential sampling; that, from the intermediate frequency signal, at least one raw echo curve or digitized envelope curve dependent on travel time or travel distance is ascertained; that the interference echo signals in the raw echo curve or digitized envelope curve are ascertained in a current, static reference curve and stored; that, in the case of a modification of at least one technical, process condition in the container and/or a modification of at least one technical, measurement condition of the measuring device, an independent reference curve is ascertained on the basis of the current, static reference curve; and that the interference echo signals are masked from the raw echo curve on the basis of a masking algorithm, which applies the independent reference curve.

By this method, it is possible to react to modifications of process conditions and modification of technical, measurement conditions of the measuring device and, thereby, to optimize the ascertaining and measuring of the fill level of a medium in a container. In this connection, the following manner of proceeding is used: From a measuring device, a measuring signal is transmitted via a transmitting- and receiving-unit and reflected on the surface of the medium as a wanted echo signal and, for example, on the disturbing elements as an interference echo signal. The total measurement signal is composed of superposed, transmitted measuring signal, wanted echo signal and, if present, interference echo signals. The low-frequency, intermediate frequency signal is produced from the total measurement signal by means of a signal sampling circuit. Basically, in this sampling method, a measuring signal is produced and transmitted, and a sampling signal is produced having a somewhat lower pulse repetition frequency or the sampling signal is produced phase modulated relative to the transmitted, measuring signal. The low-frequency, intermediate frequency signal is produced by sending the total measurement signal and the sampling frequency signal to a frequency mixer. The lower-frequency, intermediate frequency signal has the same behavior as the total measurement signal, but is expanded relative to the total measurement signal by a time expansion factor equal to the quotient of the pulse repetition frequency of the measuring signal and the frequency difference of the two frequencies of the measuring the sampling signal and the measuring signal. In the case of a pulse repetition frequency of several megahertz, a frequency difference of a few hertz and a microwave frequency of several gigahertz, a frequency of the intermediate frequency signal of smaller than 100 kHz is produced.

The transformation of the total measurement signal to the intermediate frequency signal has the advantage that relatively slower and, as a result, more cost-favorable, electronic components can be used for the signal evaluation. For an analog further processing, an analog raw echo curve is produced, which corresponds to the analog, intermediate frequency signal obtained by an averaging over a plurality of total measurement signals. If, in the following method steps, further calculation is with digital values, a digitized envelope curve, or an enveloping, is ascertained from the analog intermediate frequency signal by a rectification, optionally a logarithming, and a digitizing of the analog intermediate frequency. From the envelope curve in empty container, the so-called empty echo-curve, or empty function, a static reference curve is produced, to which is added to the amplitude values of the empty echo-curve a certain offset; alternatively, this offset is subtracted from the amplitude values of the envelope curve for the further signal processing. The static reference curve includes, especially well, the static, or time-stable, interference echo signals of fixed disturbing elements, e.g. items installed in the container. With the static reference curve, therefore, interference echo signals can be masked out of the envelope curve or the raw echo curve. If the measuring situation in the container, or in the process realm, changes, or if, for example, the filter parameters of the measuring device are modified, then the static reference curve must be adjusted to match the changed conditions. Since these changes, or modifications, of the technical, process and measurements conditions have an influence on the total measurement signal and, correspondingly, on the envelope curve, in that, for example, the position or the form of the envelop curve and the wanted echo signals, or interference echo signals, change, these influences must also be taken into consideration in the static reference curve. Otherwise, it could happen, as a possible example, that the modified wanted echo signal could be masked-out by the unmodified, static reference curve, or a modified interference echo signal could come to lie above the unmodified, static reference curve and thus be interpreted as the wanted echo signal.

An advantageous embodiment of the solution of the invention provides that an evaluation curve is produced from the raw echo curve or digitized envelope curve by a smoothing method. The evaluation curve is produced by a smoothing method, which always represents a mathematical filter function of the digitized envelope curve. For example, the smoothing is effected by applying a filter function having a window function, e.g. a smoothing means having a certain window width. These smoothing methods have, however, most often, the disadvantage that the curve form is strongly changed, and, especially, the signal width of the echo signals is broadened, since the averaging width must often be set very broadly, in order that no artifacts are obtained. The evaluation curve masks out, especially well, interference echo signals, which are statistical in nature and arise, for example, from the filling of the tank, from stirring of the medium and from a turbulent surface on the medium.

A very advantageous variant of the solution of the invention is one in which the smoothing method is implemented by a mathematical filter function with a sliding minimum. Here, a very important feature is that the signal width of the echo signals is not broadened in the evaluation curve by the smoothing of the digitized envelope curve, and, essentially, a zero, or base, line of the echo signals is formed by the evaluation line. The evaluation curve forms, in a certain sense, a reference line for the evaluating, or utilization, of the envelope curve, which reacts to the modifications of the technical, process or measurement conditions. This demand on the evaluation curve is fulfilled by a smoothing with the window filter-function of sliding minimum. The window filter-function of sliding minimum has, compared to other window filter-functions, the advantage that the setting of the window width of the filtering has no great effect on the measurement results. The evaluation curve shows, predominantly, the signal portions, which are affected by changes of the process conditions in the container.

A further, supplementing variant of the solution of the invention provides that the smoothing method by a mathematical filter function of sliding minimum is implemented with a thereon following filter function of sliding average with exponential factors. Due to the ascertaining of the evaluation curve by the window filter-function of sliding minimum, jumps in the produced evaluation curve can arise, which are prevented by the filtering of sliding minimum with exponential factors. These jumps in the evaluation curve are prevented by the exponential factors in the window filter-function, since these are not desired for the application as baseline for ascertaining the amplitude values of the wanted echos. Advantages obtained by this strong smoothing of the evaluation curve result e.g. especially in the near region of the antenna, since, thereby, the wanted echo signals are better identifiable and, in general, by this base line, higher wanted echo levels of the echo curve of the measuring signal can be obtained.

An especially advantageous further development of the solution of the invention provides that the static reference curve is produced, periodically or event-controlled, from a current empty echo curve, which is ascertained from the raw echo curve or the digitized envelope curve for the empty container. In the static reference curve, the interference echo signals are ascertained. Therefore, it is necessary to measure these interference echo signals in a first measurement in the empty container, in order that, over the entire measurement range, or container height, the interference echo signals can be ascertained and stored.

A preferred form of embodiment of the method of the invention provides that the static reference curve, in the case of not empty container, is ascertained, periodically or event-controlled, in the region above the fill level of the medium from a current empty echo curve portion and is ascertained, periodically or event-controlled, in the region beneath the fill level of the medium from a static reference curve produced in prior measurement cycles, and that the current empty echo curve portion is represented at least by the region A of the raw echo curve or the digitized envelope curve from the transmitting of the measurement signals to the reflection of the echo signal at the fill level of the medium. If the container is partially filled with the medium, then only the empty echo curve portion of the region A above the surface of the medium can be ascertained, since the measuring signal is mostly completely reflected on the surface of the medium and the interfering elements beneath the fill level of the medium are masked out in the total measurement signal. The stored, static reference curve of prior measurement cycles is over-written by the curve values of the empty echo curve portion up to the wanted echo signal. As a result of this, the static reference curve in the region A above the surface of the medium has been adjusted to fit the new measurement situation. If the fill level, i.e. the surface of the medium, sinks further, then a new echo curve portion is produced and the static reference curve thus successively renewed.

In an advantageous form of embodiment of the solution of the invention, it is provided that, on the basis of a difference building or correlation calculation, a difference curve between the evaluation curve and the static reference curve is produced and stored. In the difference curve, the curve deviations, or curve difference values, of the curve points between the current evaluation curve and the current static reference curve are ascertained and stored. By the forming of a difference curve, the relationship between the time-stable interference signals is ascertained and stored for the current measurement situation. If the current measurement situation changes, now, due to modifications of technical, process or measurement conditions, then this change is acquired by the current evaluation curve.

A practical example of an embodiment of the method of the invention has the features: That the technical, process condition involves a timewise changing of the measurement situation in the container; that the static reference curve is adjusted to match the current, timewise change of the measurement situation in the container; and a current, relative, reference curve is ascertained. Due to the situation that the static reference curve, which only represents an instantaneous reflection of the measurement situation in the container at point in time of the recording, does not consider the timewise changing of the measurement situation, a relative reference curve is calculated, which does take into consideration the timewise changing of the measurement situation.

A very advantageous variant of the solution of the invention is one having the features: That the current, relative reference curve is formed from an addition of the evaluation curve and the stored, current difference curve or the stored difference curve of prior measurement cycles. The relative reference curve is calculated from the stored difference curve, or the stored difference values, which were currently ascertained or ascertained in a prior measurement cycle, and the current evaluation curve. Since the evaluation curve is ascertained anew in each measurement cycle and adjusted to match the measurement situation in the container, the relative reference curve reacts to the timewise changing of the measurement situation, or to modification of the technical, process conditions.

A practical alternative example of an embodiment of the method of the invention has the features: That the modification of the technical condition concerning measuring involves a change of the filter parametering of the measuring device; and that, by calculating the static reference curve from the unfiltered, raw echo curve, or the unfiltered, digitized, envelope curve, the static reference curve is produced independently of the current filter parametering of the measuring device. When the filter parameters of the curve filter are changed, the curve form or position of the filtered, envelope curve, or filtered, raw echo curve no longer fits with the static reference curve, or limit curve, produced in a prior measurement cycle. If, in contrast, the static reference curve is produced from an unfiltered, envelope curve, or an unfiltered, raw echo curve, then this is independent of the filter parameters and can be further signal processed in a later method step.

An advantageous form of embodiment of the solution of the invention includes that the independent reference curve is ascertained by a filtering of the static reference curve or the relative reference curve with the current parameter settings of a filter, with which also the raw echo curve or the digitized envelope curve is processed. Since the current envelope curve, or current raw echo curve, and the static reference curve, or relative reference curve, are periodically, or under event-control, signal processed with the same filter parameters, a modification of the filter parameters affects both equally.

An especially advantageous, further development of the solution of the invention provides that, in the measuring cycle of the start-up of the measuring device, the current static reference curve and the current difference curve are ascertained and stored in a memory. In a first start-up measurement cycle, historical values of the static reference curve and the difference curve for subsequent measurement cycles are produced and stored. In the case of this measurement cycle, it is of advantage, when the static reference curve is ascertained in the empty container, whereby the entire empty echo function, or empty echo curve can be ascertained and stored.

In a further, advantageous embodiment of the solution of the invention, it is provided, that, during operation of the measuring device, reference is made back to the curve values of the static reference curve and/or the difference curve stored in prior measurement cycles, in case no modifications of the technical conditions concerning process are done, in comparison to the prior measurement cycle. The measurement cycle is continually newly executed, and, periodically or under event-control, the historical values, or curves, of prior measurement cycles are supplemented or overwritten. If, in contrast, no change of the measurement situation occurs in the container in comparison with the prior measurement cycle, then reference can be made back to the stored, historical values, or curves, of prior measurement cycles of the static reference curve and the difference curve; otherwise, new static reference and difference curves are produced.

A further, advantageous embodiment of the invention provides that the masking algorithm is executed by a difference-building and/or correlation calculation of the independent reference curve with the envelope curve or raw echo curve. A number of masking algorithms are usable for masking the interference echo signals. A difference building or correlation calculation represent simple ways in which the interference echo signals can be masked in the envelope curve or in the raw echo curve; however, other algorithms can be applied in the method of the invention, an example being calculations of correction values.

BRIEF DESCRIPTION OF THE DRAWINGS

The invention will now be explained in greater detail on the basis of the appended drawings, wherein, for simplification, identical features are provided with equal reference characters. The figures show as follows.

DETAILED DISCUSSION IN CONJUNCTION WITH THE DRAWINGS

Figure 1:
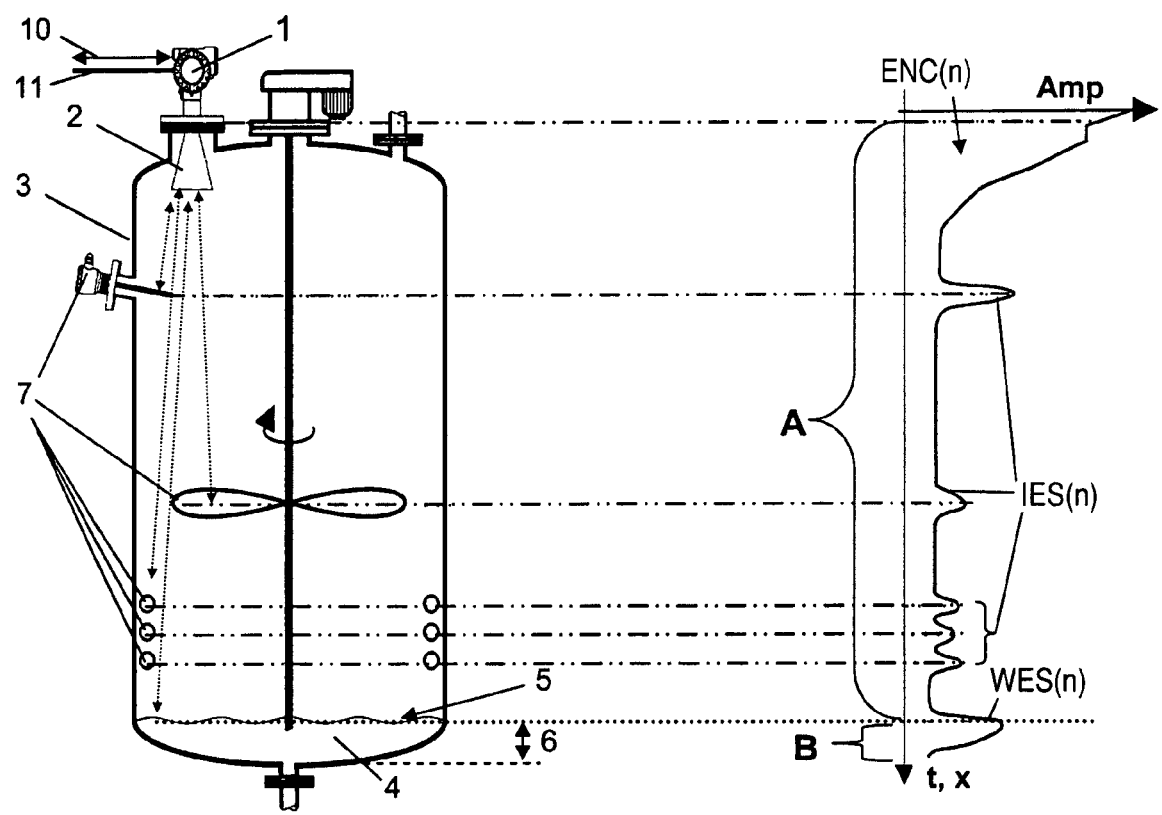
FIG. 1 an example of an embodiment of a measuring setup of a measuring device on a container having some of the possible interfering influences, along with the corresponding, digitized envelope curve.

In FIG. 1, a measuring device 1 is mounted on a container 3 in a nozzle 12. Measuring device 1 ascertains, via a travel-time measuring method, the fill level 6 of a medium 4 in the container 3. In terms of disturbing elements 7, shown in the illustration are, for example, a stirring means, a coil of cooling tube, and a limit level measuring device installed in the container wall; of course, there are also other disturbing elements 7, not explicitly pictured in the drawing, which can also influence the measuring. An envelope curve ENC(n) corresponding to the measuring situation in the container 3 is proportional to the height of the container 3. The illustrated envelope curve ENC(n) presents the amplitude Amp of the sampled, transmitted and reflected, measuring signal MS(n), as a function of the travel distance x, or travel time t. The interfering influences of the disturbing elements 7 in the container 3 and the effect of the surface 5 of the medium 4 are assigned directly via reference lines to the corresponding interference echo signals IES(n) and the corresponding wanted echo signal WES(n) in the envelope curve ENC(n), so that one can see, at a glance, the cause-effect relationship. The transmitting and receiving unit 2 is embodied as a horn antenna; however, any known transmitting and receiving unit 2, such as planar antennas, rod antennas, parabolic reflector antennas, microwave guides, sound transducers, as well as optical transmitting and receiving elements, can be used. For communication with remote measuring devices 1 or with a control location, a fieldbus 10 is provided, which operates according to usual communications standards, such as e.g. Foundation Fieldbus, Profibus-PA, and is embodied, for example, in a two-conductor technology. Supply of the measuring device 1 with energy, or power, can occur, in addition to the energy, or power, supply of the measuring device 1 via the fieldbus 10, also by means of a separate energy/power supply line 11.

Figure 2:
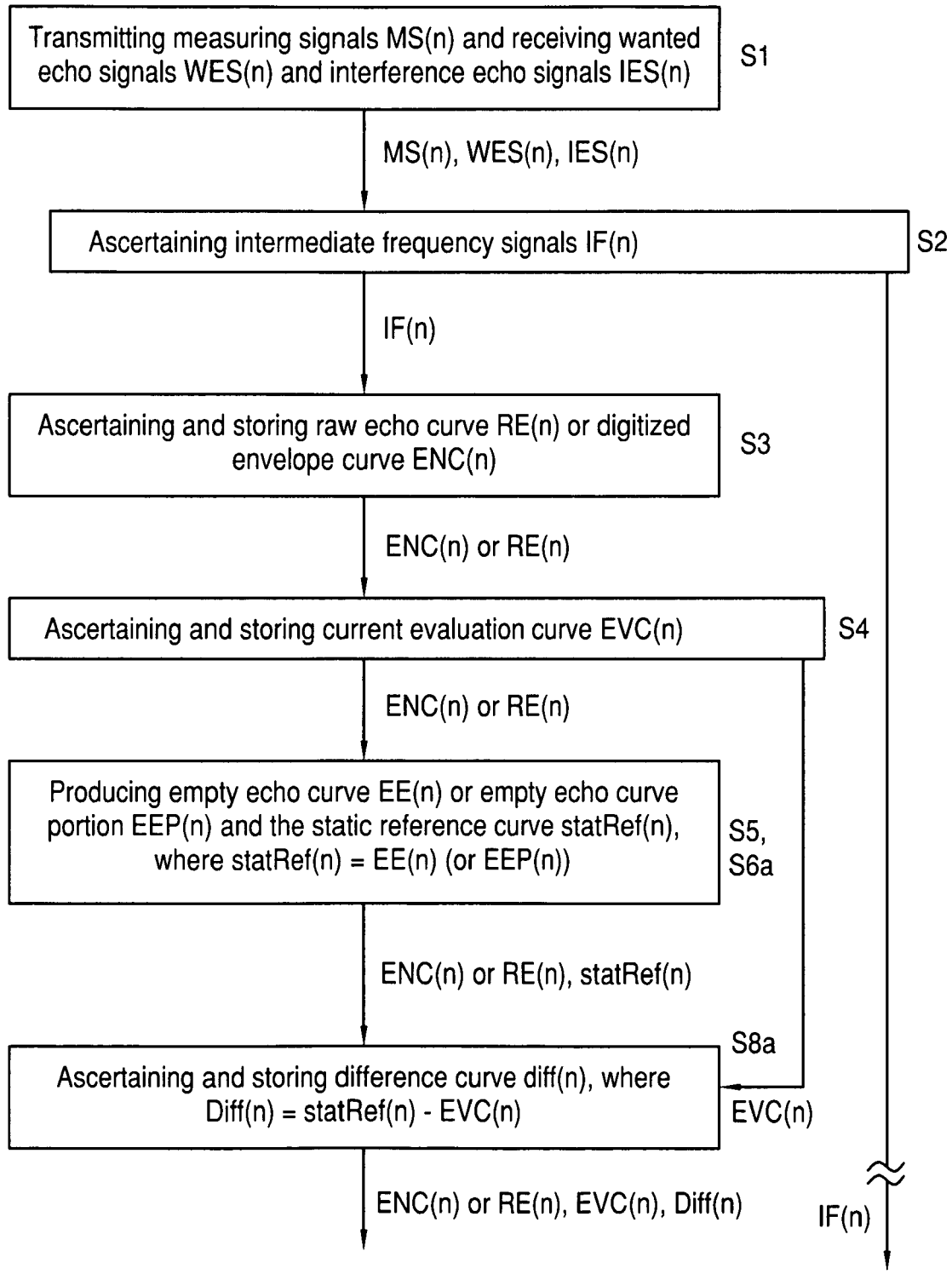
FIG. 2 a flow diagram of a method of the invention for the first measurement cycle in the start-up, or initializing, of the measuring device.

FIG. 2 shows a flow diagram of a method of the invention, in start-up mode. This start-up mode has the function of ascertaining, and storing in a memory 9, all reference values or reference curves EE(n) or PEE(n), statRef(n), Diff(n). In a first method step S1, a measuring signal MS(n) is transmitted and reflected on the surface 5 of the medium 4 as wanted echo signal WES(n) and on the surfaces 8 of the disturbing elements 7 as interference echo signals IES(n). By a sequential sampling in the second method step S2, a time-expanded, intermediate frequency signal IF(n) is produced from the total measurement signal, which is a superposition of measuring signal MS(n), wanted echo signal WES(n) and interference echo signal IES(n). From the time-expanded, intermediate frequency signal IF(n), in a third method step S3, an averaged, raw echo curve RE(n) or a rectified, digitized, envelope curve ENC(n) is ascertained. By a smoothing method, or a mathematical filter function, such as e.g. the window function of sliding minimum, in a fourth method step S4, an evaluation curve EVC(n) is formed from the envelope curve ENC(n) or the raw echo curve RE(n) and stored in a memory 9. In a fifth method step S5, the empty echo curve EE(n) is ascertained in an empty container 3. If the container 3 is partly filled with a medium 4, then only an empty echo curve portion EEP(n) can be recorded, which characterizes the empty region of the container 3 down to the surface 5 of the medium 4. The empty echo curve EE(n) contains the static interference echo signals IES(n) of the disturbing elements 7 located in the container 3. This empty echo curve EE(n) or empty echo curve portion EEP(n) with the contained interference echo signals IES(n) is, in a sixth method step S6a, stored in a static reference curve statRef(n) for later measurement cycles and further method steps. In an eighth method step S8a, a difference curve Diff(n) is produced by a subtraction of the stored, static reference curve statRef(n) from the evaluation curve EVC(n). In this difference curve Diff(n), the difference is ascertained and stored, which the static interference echo signals IES(n) have with respect to the evaluation curve EVC(n). Since the evaluation curve EVC(n) is ascertained in each measuring cycle Mcyc(n) anew from the envelope curve ENC(n) or the raw echo curve RE(n), and this curve reacts to changes of the process conditions, a static reference curve statRef(n) dependent on the current evaluation curve EVC(n) is created.

Figure 3:
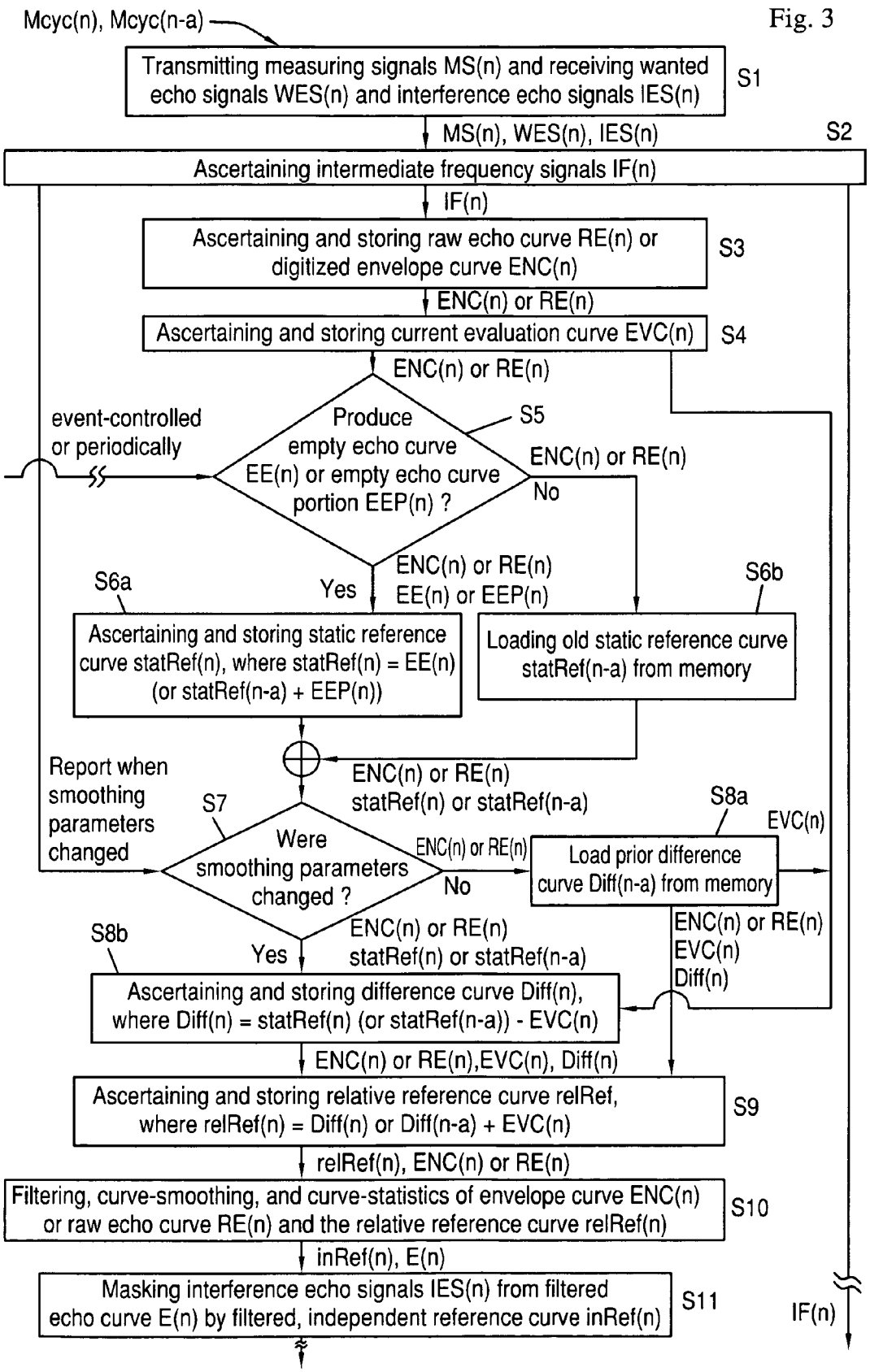
FIG. 3 a flow diagram of a method of the invention for a measurement cycle during operation of the measuring device.

FIG. 3 shows a further flow diagram of the method of the invention in the operation of the measuring device 1. As already indicated in the description of FIG. 2, in the first to the third process steps S1, S2, S3, a time-expanded, intermediate frequency signal IF(n) is produced from the total measurement signal TS(n), and from the intermediate frequency signal IF(n), a digitized envelope curve ENC(n) or raw echo curve RE(n) is determined. In a further, fourth method step S4, a current evaluation curve EVC(n) is determined and stored. If in a fifth method step S5, event-controlled or periodically, a new empty echo curve EE(n) or an empty echo curve portion EEP(n) is ascertained; then, in a sixth method step S6a, the empty echo curve EE(n) is stored as static reference curve statRef(n) or a portion of the static reference curve statRef(n-a) produced in a prior measurement cycle Mcyc(n-a) or in the start-up mode is overwritten by the empty echo curve portion EEP(n). An event, which can trigger such an action of a new ascertaining of an echo curve portion EEP(n), is, for example, a decreasing fill level of the medium, as detected in previous measurements. Should no new empty echo curve EE(n) be recorded, in the sixth method step S6b, a static reference curve statRef(n-a) of prior measurement cycles Mcyc(n-a) is loaded from the memory 9. If, in this measurement cycle Mcyc(n), in contrast with the prior measurement cycle Mcyc(n-a), in the ascertaining of the evaluation curve EVC(n), the smoothing parameters, such as e.g. window width of the digital filtering, or the mathematical filter functions, have been changed, then, in an eighth method step S8a, as shown before in the description of FIG. 2, a current difference curve Diff(n) must be ascertained. Otherwise, in an eighth method step S8b, reference can be made back to the stored difference curve Diff(n-a) of prior measurement cycles Mcyc(n-a). In a ninth method step S9 of the measuring cycle Mcyc(n), by the addition of the current difference curve Diff(n) or the difference curve Diff(n-a) of prior measurement cycles Mcyc(n) with the current evaluation curve EVC(n) of this measurement cycle, a relative reference curve relRef(n) is formed. This relative reference curve combines the advantages of the evaluation curve EVC(n), that the evaluation curve EVC(n) reacts to time changes of the technical conditions of the process in the container 3, with the advantage of the static reference curve statRef(n), that interference echo signals IES(n) of, for example, disturbing elements 7 in the container 3 are ascertained in this curve. In order that the changes of the technical conditions concerning measuring, such as e.g. the filter parameters, act equally on the relative reference curve relRef(n) and on the envelope curve ENC(n) or raw echo curve RE(n), in a tenth method step S10, both are processed equally as regards measurement technical features, or filtered with the same filter parameters. In a last, eleventh, method step S11, the interference echo signals IES(n) are removed from the echo curve E(n) using the filtered, independent reference curve in Ref(n).

Figure 4:
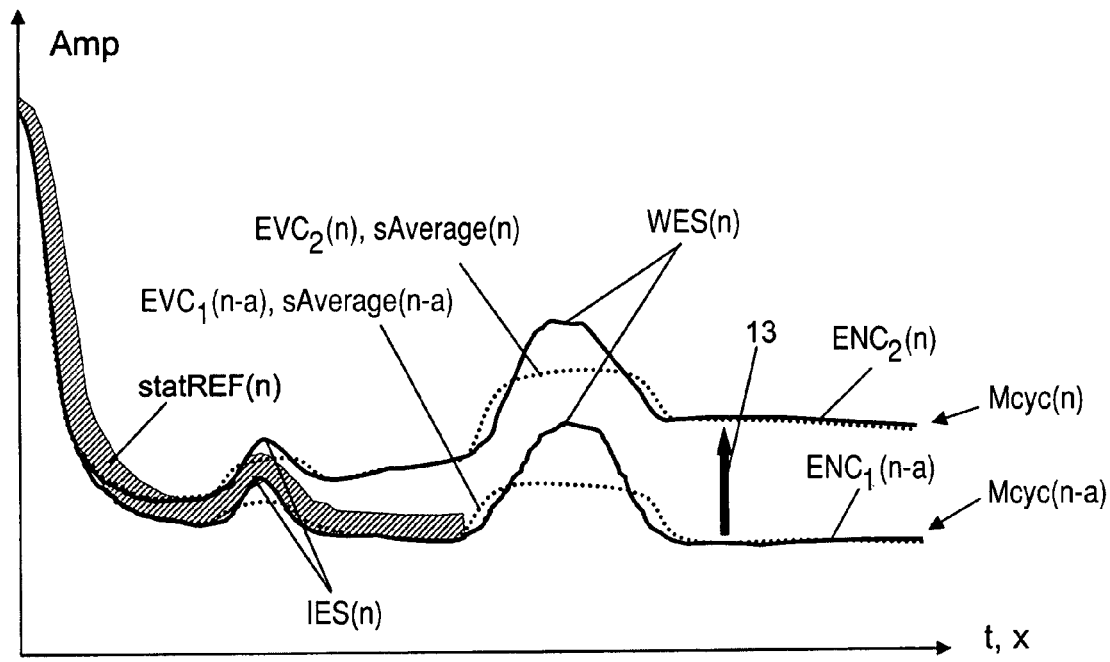
FIG. 4 a graph with masking of interference echos in the method of the state of the art.

FIG. 4 is a graph with two envelope curves ENC(n), which were ascertained according to a method known from the state of the art. Plotted on the abscissa is the time t consumed, or the distance x traveled, by the measuring signal in the container 3, while the ordinate provides the amplitude value Amp of the envelope curve ENC(n) of the total measurement signal TS(n). In the graph, two envelope curves ENC(n) are presented: A first envelope curve $ENC_1(n-a)$ shows the measurement result of a prior measurement cycle Mcyc(n-a) and a second envelope curve $ENC_2(n)$, which, due to changes of technical, process conditions, such as e.g. accretion formation of the medium on the wall of the container 3 or the state before and after filling of the container 3, has a rise, or gradient, 13 relative to the first envelope curve $ENC_1(n-a)$. Shown in the graph, also, are two evaluation curves EVC(n), which were ascertained from the respective envelope curves ENC(n) using a mathematical filter function, the sliding average sAverage(n). It can be seen that the evaluation curve $EVC_2(n)$ reacts to the rise of the envelope curve $ENC_2(n)$ and thus to the changes of the technical, process conditions. The static reference curve statRef(n-a) was produced in a prior measurement cycle Mcyc(n-a) and was stored. In the current measurement cycle Mcyc(n), the envelope curve $ENC_2(n)$ rises gently, whereby the interference echo signal IES(n) in the envelope curve $ENC_2(n)$ lies above the stored, static reference curve statRef(n), i.e. the masking curve, and is no longer masked out.

Figure 5:
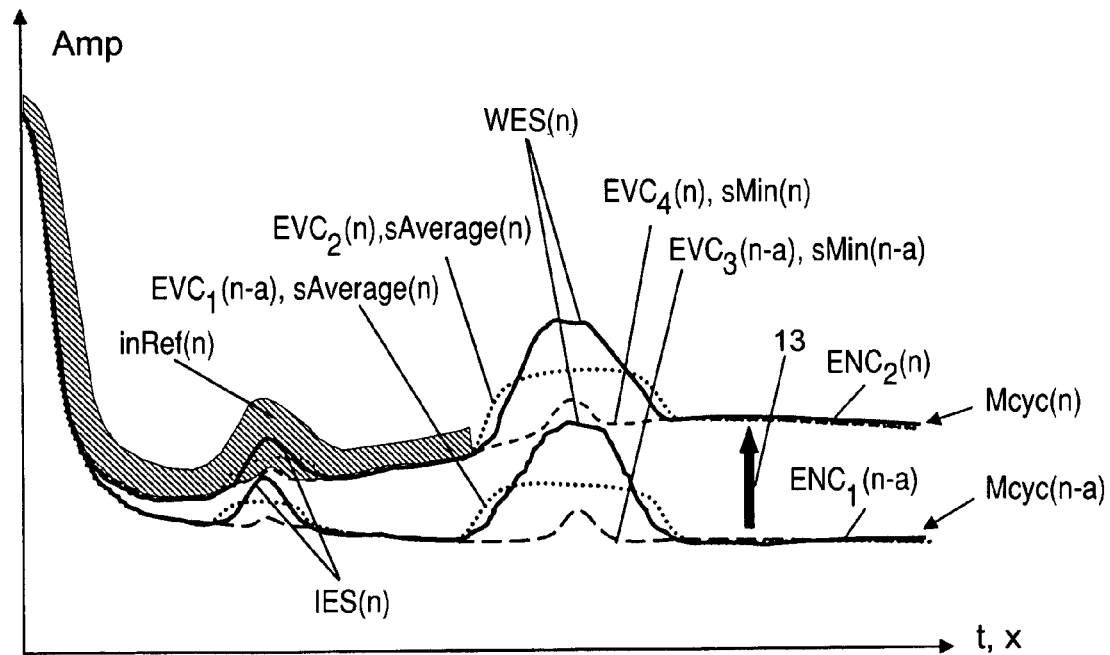
FIG. 5 a graph with masking of interference echos in a method of the invention.

FIG. 5 shows a graph having two envelope curves ENC(n), which were ascertained according to the method of the invention. For bringing out the difference between the two methods, the same envelope curves ENC(n) and evaluation curves EVC(n) of the sliding average gAverage(n) as in FIG. 4, of the prior measurement cycle Mcyc(n) and of the current measurement cycle Mcyc(n), were used. By ascertaining the independent reference curve in Ref(n), in the method of the invention, the interference echo signal IES(n) is masked-out in the second envelope curve $ENC_2(n)$. The independent reference curve in Ref(n) adapts to the modification of the current evaluation curve $EVC_4(n)$ and thus reacts to changes of technical, process conditions. The current evaluation curve $EVC_4(n)$ was produced by a mathematical filter function of sliding minimum. The evaluation curve $EVC_4(n)$ has, compared with the evaluation curves $EVC_2(n)$ and $EVC_2(n-a)$, the advantage that the smoothing method of the sliding minimum evokes no signal broadening of the wanted echo signals WES(n) or the interference echo signals IES(n) and forms a kind of baseline of the wanted echo signals WES(n) or interference echo signals IES(n).

Figure 6:
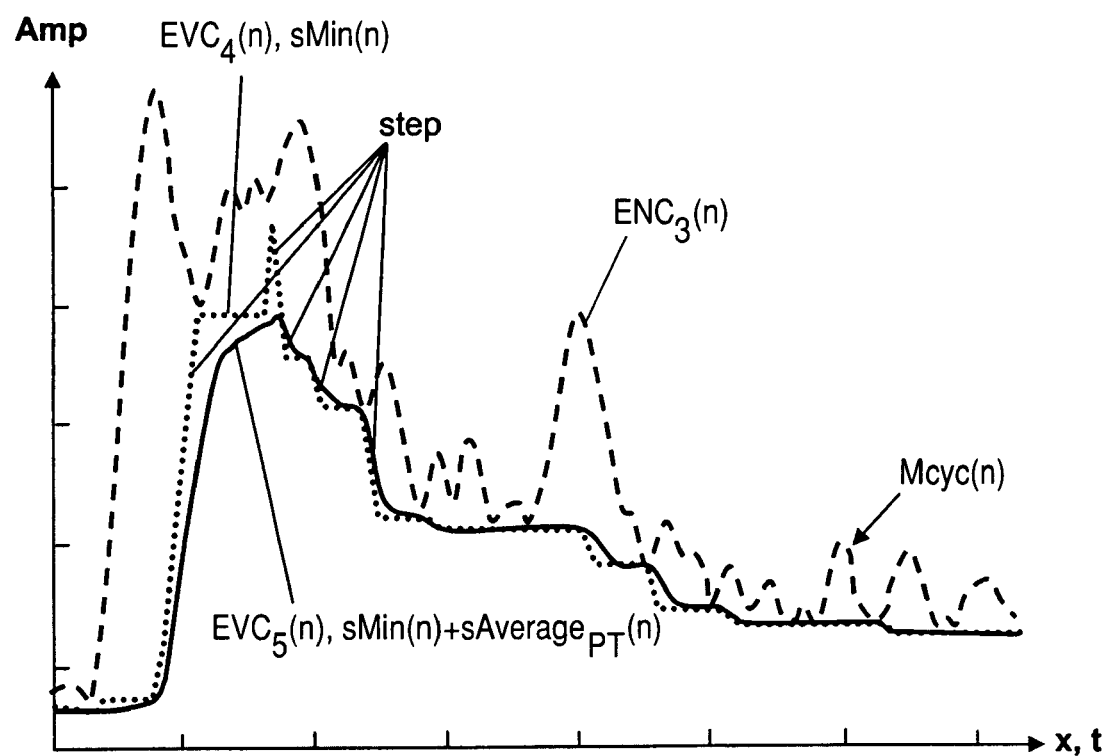
FIG. 6 a graph with an evaluating of the envelope curve by an evaluation curve according to a method of the invention.

FIG. 6 is a graph with a third envelope curve $ENC_3(n)$, which is evaluated according to the method of the invention by means of the fifth evaluation curve $EVC_5(n)$. In this graph, in contrast to the graphs in FIGS. 4 and 5, another example of an evaluation curve EVC(n) is presented. The smoothed, fifth evaluation curve $EVC_5(n)$ was produced by a mathematical filter function of sliding minimum with a subsequent filtering with a filter function of sliding average with exponential factors ($sAverage_{PT}(n)$). The evaluation curve $EVC_4(n)$ has, compared to the evaluation curves $EVC_2(n)$ and $EVC_1(n-a)$ in FIGS. 4 and 5, as already indicated above, the advantage that the smoothing method of sliding minimum evokes no signal broadening of the wanted echo signals WES(n) or the interference echo signals IES(n) and forms a kind of baseline of the wanted echo signals WES(n) or interference echo signals IES(n). However, in the ascertaining of the evaluation curve $EVC_4(n)$ according to the method of sliding minimum sMin(n), abrupt steps can occur in the evaluation curve $EVC_4(n)$, which are filtered out of the evaluation curve $EVC_4(n)$ by a subsequent, second filtering with a filter function of sliding average with exponential factors $sAverage_{PT}(n)$. The fifth evaluation curve $EVC_5(n)$ obtained in this way by this second filtering no longer has abrupt steps in its curve, so that this qualifies for an application for determining the amplitude values Amp for the envelope curve $ENC_3(n)$.

The invention claimed is:

1. A method for evaluating and correcting a total measurement signal (TS(n)) of a measuring device working according to a travel-time measuring method and applied for ascertaining continuous fill level of a medium in a container, comprising the steps of:

transmitting and receiving measurement signals during a measurement cycle toward the medium and reflected on a surface of the medium as wanted echo signals or on a surface of a disturbing element as interference echo signals;

producing an intermediate frequency signal, from a total measurement signal having a frequency higher than the intermediate frequency signal, the total measurement signal being composed of the superposition of the transmitted measuring signals, the reflected, wanted echo signals, and the interference echo signals, by a sequential sampling;

determining, from the intermediate frequency signal, at least one raw echo curve or digitized envelope curve as a function of travel time or travel distance;

wherein the interference echo signals in the raw echo curve or digitized envelope curve are ascertained in a current static reference curve and stored;

ascertaining an independent reference curve, in the case of a modification of at least one technical, process condition in the container and/or a modification of at least one technical, measurement condition of the measuring device on the basis of the current static reference curve; and masking out the interference echo signals out of the raw echo curve on the basis of a masking algorithm, which applies said independent reference curve.

2. The method as claimed in claim 1, wherein:
an evaluation curve is produced from the raw echo curve or digitized envelope curve by a smoothing process.

3. Method as claimed in claim 1, wherein:
the static reference curve is produced, periodically or event-controlled, from a current empty echo curve, which is ascertained from the raw echo curve or digitized envelope curve in an empty container.

4. Method as claimed in claim 1, wherein:
said static reference curve is, in the case of a not-empty container, ascertained, periodically or event-controlled, in a first region above the fill level of the medium from a current empty echo curve portion, and, in a further region beneath the fill level of the medium from a static reference curve produced in a prior measurement cycle; and the current empty echo curve portion is represented at least by said first region of the raw echo curve or the digitized envelope curve from transmission of the measuring signals until reflection of the wanted echo signal.

5. The method as claimed in claim 1, wherein:
the independent reference curve is ascertained by a filtering of the static reference curve or the relative reference curve with the current parameter settings of a filter, with which also the raw echo curve or the digitized envelope curve is processed.

6. The method as claimed in claim 1, wherein:
the modification of a technical, measurement condition involves a change of the filter parametering of the measuring device; and by calculating the static reference curve from the unfiltered raw echo curve or the unfiltered, digital envelope curve, the static reference curve is produced independently of the current filter parametering of the measuring device.

7. Method as claimed in claim 5, wherein:
the modification of the technical, process condition involves a time change of the measurement situation in the container, and the static reference curve is matched to the current, time change of the measurement situation in the container and a current relative reference curve is ascertained.

8. The method as claimed in claim 1, wherein:
in a measurement cycle of start-up of the measuring device, the current, static reference curve and the current difference curve are ascertained and stored in a memory.

9. The method as claimed in claim 1, wherein:
during operation of the measuring device, curve values of the static reference curve and/or the difference curve stored in prior measurement cycles are/is accessed and, in case no modifications of technical, process and/or measurement conditions have occurred, compared to the prior measurement cycle.

10. The method as claimed in claim 1, wherein:
the masking algorithm is performed by a difference building and correlation calculation of the independent reference curve with the envelope curve or raw echo curve.

11. The method as claimed in claim 2, wherein:
said smoothing process is implemented by a mathematical filter function of sliding minimum.

12. Method as claimed in claim 2, wherein:
said smoothing process is implemented by a mathematical filter function of sliding minimum with, following thereon, a filter-function of sliding average with exponential-factors.

13. Method as claimed in claim 2, wherein:
based on a difference building or correlation calculation, a difference curve between the evaluation curve and the static reference curve is produced and stored.

14. Method as claimed in claim 13, wherein:
the current relative reference curve is formed from an addition of the evaluation curve and the stored, current difference curve or the stored difference curve of prior measurement cycles.

* * * * *